May 9, 1933.  C. R. BIRDSEY  1,907,717
METHOD OF AND APPARATUS FOR CALCINING GYPSUM
Filed Dec. 26, 1928  3 Sheets-Sheet 1
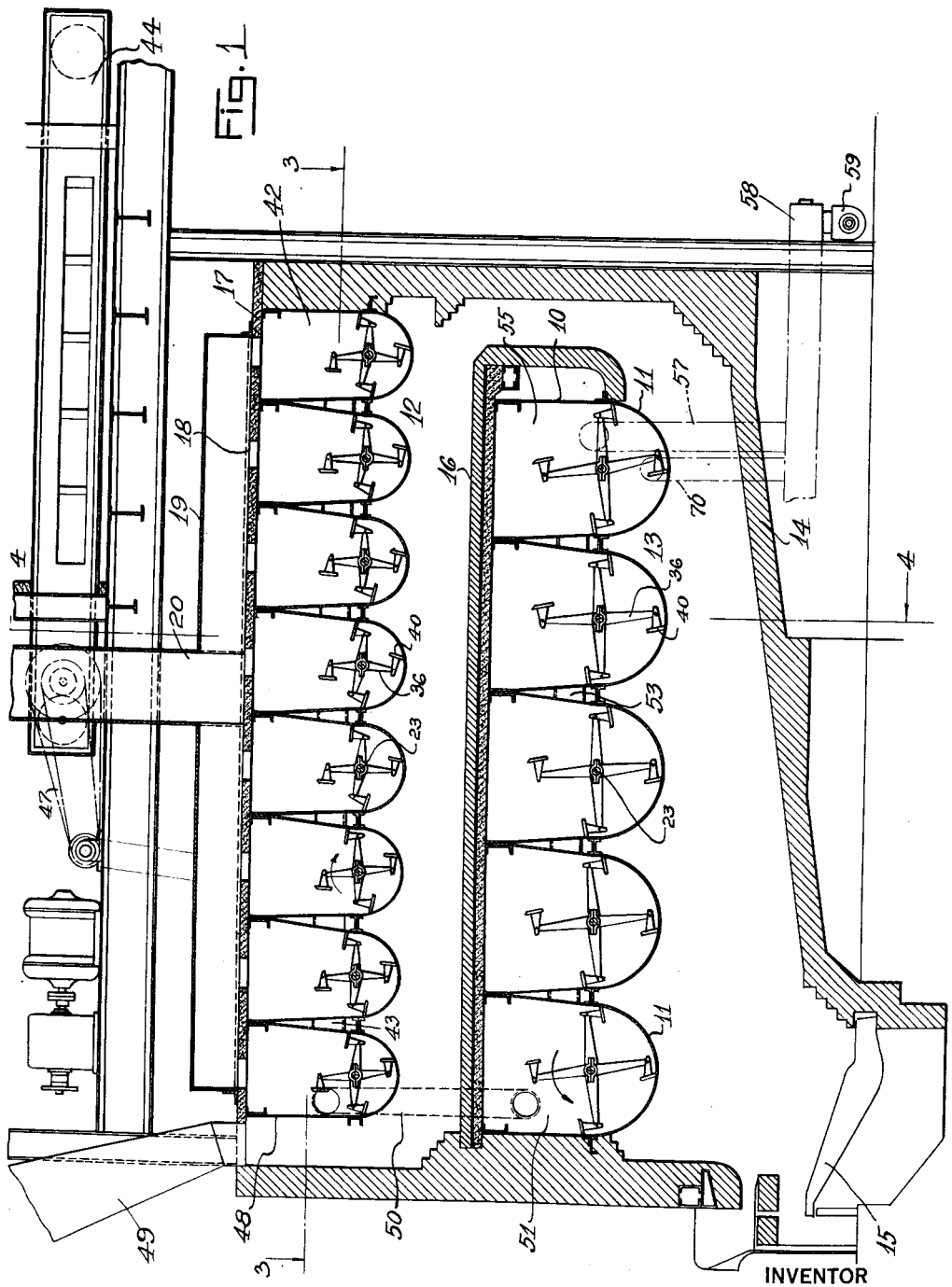
INVENTOR
CHARLES R. BIRDSEY.
BY
ATTORNEY May 9, 1933.  C. R. BIRDSEY  1,907,717
METHOD OF AND APPARATUS FOR CALCINING GYPSUM
Filed Dec. 26, 1928  3 Sheets-Sheet 2
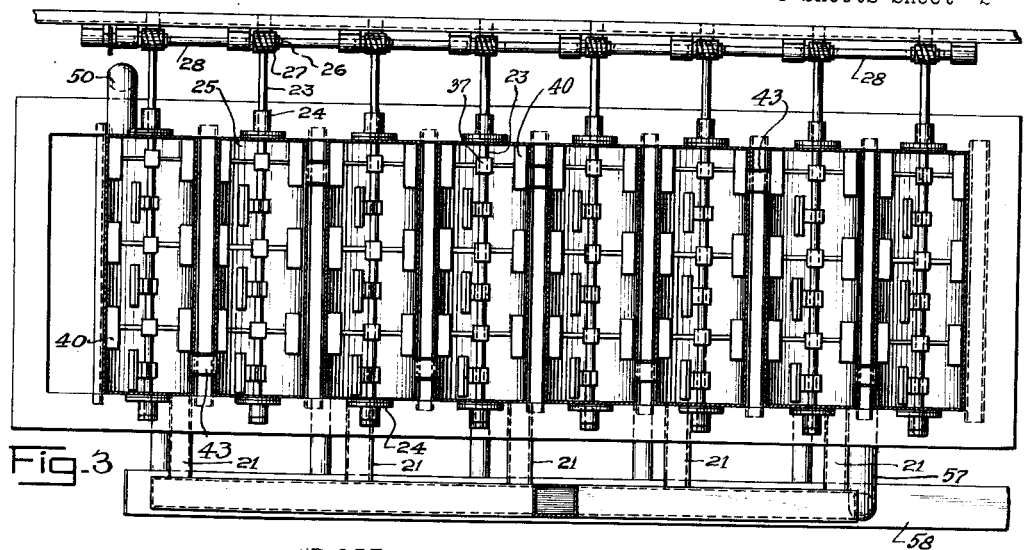
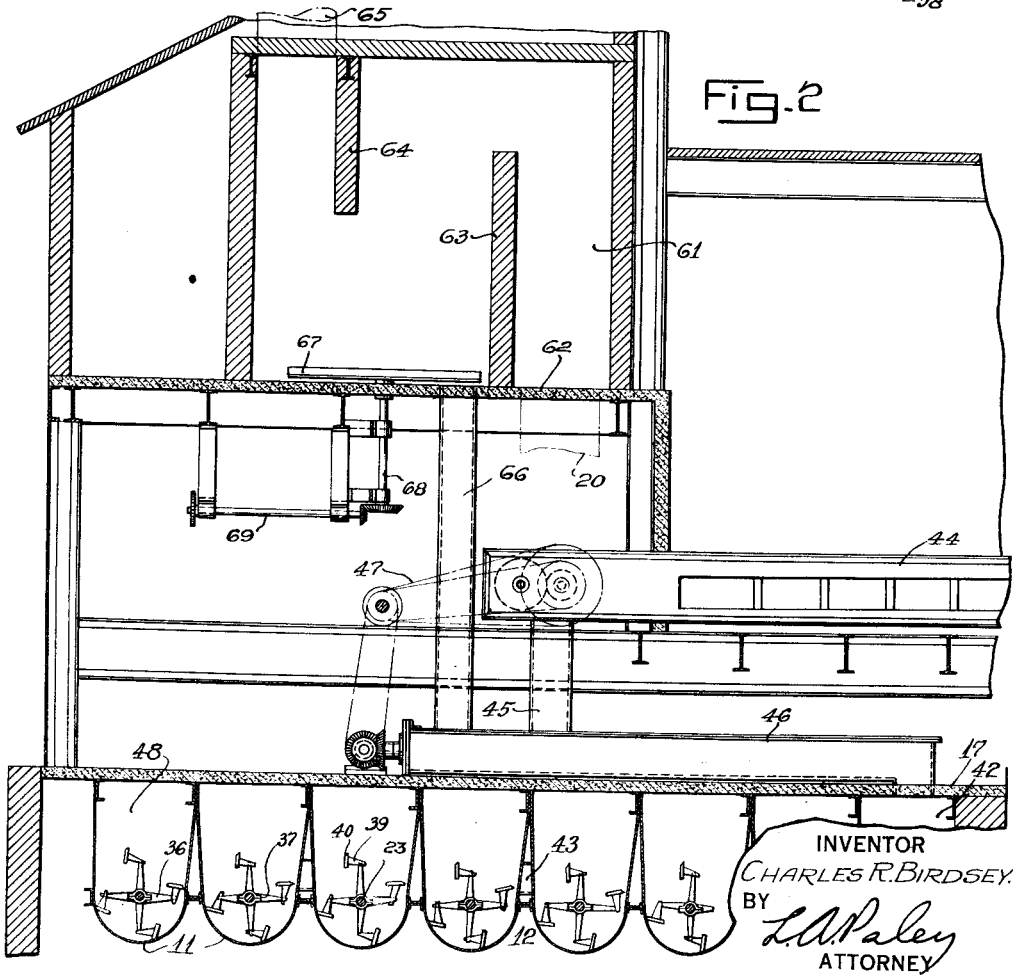
INVENTOR
CHARLES R. BIRDSEY.
BY
L. A. Paley
ATTORNEY

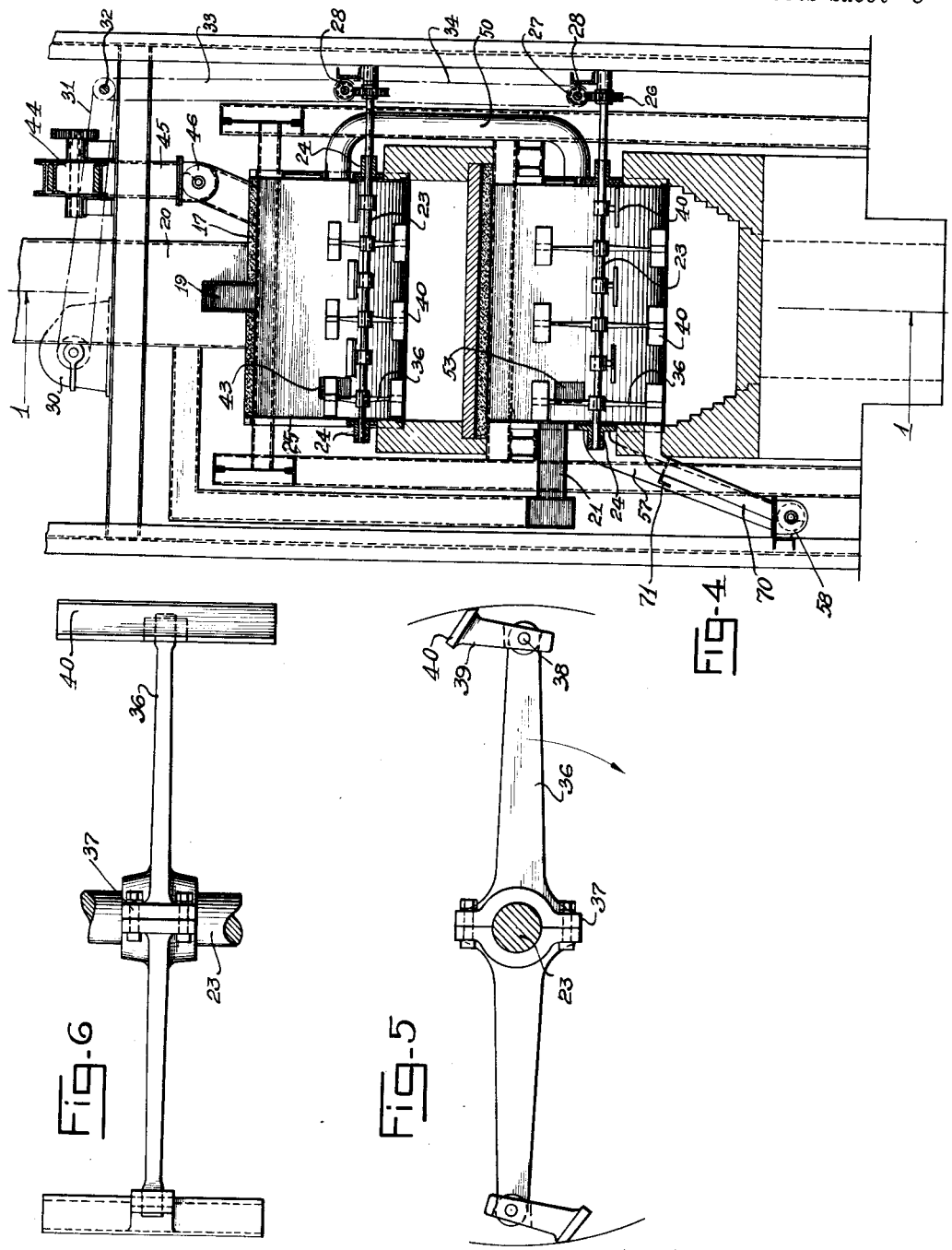

Patented May 9, 1933

1,907,717

UNITED STATES PATENT OFFICE

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS

METHOD OF AND APPARATUS FOR CALCINING GYPSUM

Application filed December 26, 1928. Serial No. 328,521.

This invention relates to an apparatus for heating materials and has reference more particularly to an apparatus of the class described in which gypsum is heated in shallow layers for the purpose of calcining same.

In the past it has been customary to calcine gypsum so as to remove part, or most of the water of crystallization, by heating same in large kettles which usually have a diameter of about 10 feet and a depth of about 10 feet. The calcining reaction is promoted by mechanically operated agitators in the kettles and heat is transferred to the center of the mass of gypsum by means of heating flues extending transversely through the kettle. However, I have found that because of the great depth of the body of gypsum, the water vapors in the form of steam driven off from the bottom of the material have to pass up through the entire column of gypsum so that the upper portion of the kettle charge of gypsum is the last to become dehydrated, and as a result, a product of non-uniform quality is apt to result. Furthermore, the heat is transferred rather slowly to the center of the mass in spite of the internal heating flues so that the speed of heating and efficiency of heating is not as high as could be desired.

An object of this invention, therefore, is to provide a method of, and apparatus for the calcining of gypsum in shallow layers so that free escape of the steam produced by the water of crystallization is freely permitted.

Another object of the invention is to provide an apparatus for calcining gypsum in which the temperature of the stack gases resulting from the heating operation is reduced to a very low point so that a high fuel efficiency is obtained.

A further object of the invention is to provide an apparatus for calcining gypsum in which a parallel flow between the calcining gypsum and the heating gases is maintained to prevent overheating of the gypsum at any one point.

A still further object of the invention is to provide an apparatus for calcining gypsum in which the heating surfaces are continually scraped to prevent the burning of gypsum and the adhering of same to the heating surface; also to improve methods of and apparatus for the calcining of material in other respects hereinafter specified and claimed.

Reference is to be had to the accompanying drawings forming a part of this specification, in which Fig. 1 is a sectional elevation through the lower part of my improved calcining apparatus, Fig. 2 is a sectional elevation through the upper part of the calcining apparatus, Fig. 3 is a sectional plan view through the apparatus taken on the line 3—3 of Fig. 1, Fig. 4 is a sectional elevation through the apparatus taken on the line 4—4 of Fig. 1, Fig. 5 is a sectional elevation showing on a large scale, one of the agitator and scraper devices, and Fig. 6 is a plan view showing one of the agitator-scraper devices.

My improved apparatus consists essentially of a plurality of shallow, elongated pans 10 having semi-circular bottoms 11, these pans being arranged preferably in series, the series of pans being divided into two parts, as shown in Fig. 1, so as to form an upper series of pans 12 and a lower series of pans 13. Both series of pans 12 and 13 are mounted in a suitable setting 14 of brick work or other masonry material, said setting being provided with a grate 15 or other standard means for supplying heat to the setting. It should be understood that coal, oil, gas, or other fuel may be burned in the setting to produce the heat necessary for the calcination of the gypsum.

An imperforate roof 16 extends over the tops of the series of pans 13 so as to close same against the escape of steam, and a roof 17 extends over the series of pans 12. The roof 17 has a series of openings or holes 18, one adjacent each of the pans in the series, said holes permitting the escape of steam from the series of pans 12 into a duct 19 which connects with a vertically extending flue 20. It should be noted that the roof 16 with the series of pans 13 serves as a baffle in the furnace setting 14 to increase the path of travel of the hot gases of combustion. The pans in series 12 are preferably somewhat smaller in cross sectional area than the pans in series 13, since in the pans 13, the volume of the material is somewhat increased due to ebullition and boiling of the material resulting from the escaping steam. To the end of each of the pans in series 13, a duct 21 is secured, said duct leading upwardly and connecting with the flue 20 so that steam from the pan series 13 is also delivered into said flue 20. Mounted in each of the pans of series 12 and 13 is an agitator shaft 23, said shaft being mounted in suitable bearings 24 secured to the ends 25 of the pans. Secured to one end of each shaft 23 is a worm wheel 26 which meshes with a worm 27 secured to a shaft 28, the latter extending longitudinally of the pan series 12 and 13. Any suitable driving means for the shafts 28 may be used, such as an electric motor 30 connected by a chain 31 to a countershaft 32, the latter being connected by chain 33 to the upper shaft 28. The two shafts 28 may be connected by a chain 34.

The agitating devices mounted upon the shafts 23 are preferably in the form of arms 36 which are provided with suitable flanges 37, the latter being adapted to be rigidly bolted as a hub around a shaft 23. The outer end of each arm 36 is provided with a pivot pin 38 upon which is mounted a scraper arm 39. An obliquely extending scraper knife 40 is formed on the outer end of scraper arm 39, and as seen in Fig. 1, as the shaft 23 rotates, the scraper knives 40 fall against the heating surface of the pan bottom 11 so as to continually scrape along said heating surface to prevent the accumulation of burned gypsum thereon. The scraper knives 40 are preferably elongate in character so as to extend along a substantial length of the pans 10.

The material is preferably introduced into the end pan 42 of the series 12, and connecting ducts 43 connect the ends of the pans in the upper series 12 in alternate arrangement so that the ground gypsum is caused to travel in a circuitous path down one pan and up the next through the series. The flow of gypsum through the pans is assisted by the agitating scraper devices and the flow of material is induced also by the head of material maintained in the end pan 42. The ground gypsum may be introduced into the end pan 42 in any suitable way such as by a drag chain conveyor 44 leading from any suitable source of supply, said conveyor being connected by a duct 45 to a screw conveyor 46 which empties into the end pan 42. Suitable driving mechanism 47 is used to cause the movement of the drag chain conveyor and screw conveyor 46.

After the ground gypsum passes through the pan series 12 into end pan 48, considerable water of crystallization has been driven off from the gypsum in the form of steam which passes up flue 20 the heat being supplied by the hot gases of combustion just before they pass up a stack 49. The heated and partially dehydrated gypsum now passes out of end pan 48 through a duct 50 into end pan 51 of the pan series 13. Here, the ground gypsum is subjected to the hottest temperature since the pan 51 is positioned directly above the gate 15. A rapid boiling of the powdered material now takes place due to the evolution of steam, the steam passing out through duct 21, to the flue 20. It should be understood that while I have illustrated the gases of combustion as travelling parallel to the path of movement of the gypsum, this arrangement may be reversed by changing the material connections to the pan series so that the flow of the hot gases is counter-current to the flow of material in the pan series. The pans in series 13 are also connected by ducts 53 in alternate arrangement, the same as the upper series of pans 12, and when the material reaches end pan 55, a large part of the water of crystallization is driven off from the gypsum. The degree of dehydration of the gypsum can be regulated by the speed of feeding of the ground gypsum to pan 42 and by the amount of heat supplied to the furnace setting 14. The pans of the lower series are larger in volume and cross-sectional area to accommodate the gypsum which has a greater bulk at the higher temperatures due to the boiling and the splitting up of the particles.

A duct 57 leads from the end pan 55 to any suitable discharge mechanism such as screw conveyor 58 which in turn leads to a second screw conveyor 59. The screw conveyor 59 may convey the dehydrated gypsum to a cooling device of standard design and then to a storage bin.

The upper end of flue 20 empties into a chamber 61 of considerable volume so that the velocity of the steam leaving the pan is considerably decreased, thus causing any particles of gypsum entrained in the steam to settle to the bottom 62 of said chamber. Suitable baffles 63 and 64 may be provided in the chamber 61 so as to aid in the separation of the particles of gypsum. The steam finally leaves the chamber 61 through a stack 65 and the particles of gypsum settling to the floor 62 fall through a duct 66 into the feed screw conveyor 46. In order to insure that gypsum does not accumulate in the chamber 61, a sweep or scraper 67 is mounted on the upper end of a shaft 68 adjacent the floor 62 of the chamber and said sweep 67 is slowly rotated by means of a power shaft 69 driven from any suitable source of power not shown. A drain duct 70, connected to the end pan 55 is provided with a gate 71 which may be opened if desired to permit the removal of all the gypsum from the apparatus.

It should be understood that while I have mentioned the calcining of gypsum as one of the uses of my improved apparatus, I do not wish to limit myself to this particular material since obviously other materials may be heated or calcined or treated in the apparatus and still come within the scope of the following claims.

In operation, the ground gypsum to be calcined is to convey through conveyor 44 and falls through duct 45 into conveyor 46 which conveys the ground gypsum to end pan 42. The agitating and scraping knives 40 continuously rotating in the pans of the upper series 12, aid the ground gypsum to be heated up and give off steam, said gypsum travelling in a circuitous path successively through the pans of series 12 through ducts 43.

When the ground gypsum reaches the pan 48, it falls through duct 50 into pan 51 where it is subjected to the highest temperature of the furnace. The material continues to pass from pan to pan in series 13 through ducts 53 until it reaches the end pan 55 where it falls through duct 57 into conveyor 58 and is conveyed away through said conveyor into another conveyor 59 to a suitable discharge point. The steam from pan series 12 passes through openings 18, duct 19 and flue 20, up into dust settling chamber 61 and then into stack 65. The accumulated particles of gypsum fall through duct 66 into feed conveyor 46, the flow of gypsum particles through duct 66 being aided by slowly rotating sweep 67. The heat for furnace setting 14 to cause the calcination of the gypsum, is supplied from a grate 15 or any other suitable heating means, the gases of combustion passing in parallel flow along pan series 12 and 13 and up into stack 49.

I would state in conclusion that while the above description discloses a certain embodiment of my invention, I do not wish to limit myself precisely to these details since manifestly the same can be considerably varied without departing from the spirit of the invention as defined in the appended claims.

Having thus described my invention, I claim as new and desire to secure by Letters Patent:

1. In an apparatus for calcining material, a furnace setting, a heating device associated with said setting, at least two series of interconnected pans positioned in said setting, one series of pans serving as a baffle for the hot gases of combustion to give said gases a circuitous path through said setting, agitating devices associated with said pans, means for feeding material to said pans, and means for withdrawing vapors and gases from said pans.

2. In an apparatus for calcining gypsum material, a substantially horizontal pan having a semi-circular bottom and being comparatively shallow in depth as compared to the length thereof, an agitator shaft rotatably mounted in said pan, means for continuously supplying ground material to be calcined to one end of said pan so that said material passes under the action of gravity and because of the fluidity of the heated material to the other end of said pan, means for heating said pan, means for withdrawing vapors and gases from said pan, and agitator arms on said shaft adjusted to cause the agitation of said materials during the calcination and gravity movement of the gypsum longitudinally of said pan.

3. In an apparatus for calcining gypsum, a series of interconnected pans arranged in a substantially horizontal plane, means for supplying heat to said pans, feed means for the gypsum to be calcined, agitating devices associated with said pans, a second series of interconnected pans positioned below the first series of pans, said second series of pans being provided with heating means common to the first series of pans, means for conveying the heated gypsum from the first to the second series of pans, and means for withdrawing gases and vapors from the pans of both series.

4. In an apparatus for calcining gypsum, a plurality of pans arranged in two substantially horizontal series comprising an upper series and a lower series, feed means for said gypsum, means for heating the pans of both series by gaseous products of combustion so that the highest temperature gases are applied to the lower series of pans, the pans in said lower series each having a larger volume than the pans in the upper series, and means for withdrawing gases and vapors from the pans of both series.

5. In a calcining apparatus, at least two series of pans, means for feeding gypsum to be calcined to said pans, agitating devices associated with said pans, means for withdrawing gases and vapors from said pans, and means for supplying heat to said pans in such a way that the heated gases of combustion travel in a direction substantially parallel to the general direction of flow of the material through said two series of pans.

6. In a gypsum calcining apparatus, a series of interconnected pans arranged in a substantially horizontal plane, agitating devices associated with said pans, means for heating said pans, a continuously operated feeder for continuously introducing gypsum into the first pan of the series so as to cause said gypsum to flow through said pans under the action of gravity and independently of said agitating devices, the last of said pans being provided with an open overflow port for continuously discharging the calcined gypsum, and means for permitting the escape of gases and vapors from said pans.

CHARLES R. BIRDSEY.